United States Patent [19]
DeLoach

[11] Patent Number: 5,387,057
[45] Date of Patent: Feb. 7, 1995

[54] CONTAMINATED GROUND SITE REMEDIATION SYSTEM

[76] Inventor: Anthony DeLoach, 1631 Jewel Dr., Sarasota, Fla. 34240

[21] Appl. No.: 149,313

[22] Filed: Nov. 9, 1993

[51] Int. Cl.⁶ .............................................. B09B 3/00
[52] U.S. Cl. ................................... 405/128; 166/370; 405/52; 588/249
[58] Field of Search ............... 405/128, 129, 52, 258; 166/370, 266, 267, 67, 53, 64; 210/747, 751

[56] References Cited

U.S. PATENT DOCUMENTS

| | | | |
|---|---|---|---|
| 5,050,676 | 9/1991 | Hess et al. | 166/370 X |
| 5,095,975 | 3/1992 | Bernhardt | 166/67 |
| 5,115,866 | 5/1992 | Corte et al. | 166/370 |
| 5,221,159 | 6/1993 | Billings et al. | 405/128 |
| 5,246,309 | 9/1993 | Hobby | 405/128 |
| 5,249,888 | 10/1993 | Braithwaite et al. | 405/128 |
| 5,271,693 | 12/1993 | Johnson et al. | 405/128 |
| 5,277,518 | 1/1994 | Billings et al. | 405/128 |
| 5,332,333 | 7/1994 | Bentley | 405/128 |

*Primary Examiner*—Dennis L. Taylor
*Attorney, Agent, or Firm*—Charles J. Prescott

[57] ABSTRACT

A system and method of remediating a ground site contaminated with volatile chemical material such as volatile organic compounds (VOC). The system includes an array of elongated spaced dewatering wells embedded into the contaminated ground for lowering the ground water level in this area. The system also includes an array of spaced vacuum extraction wells also embedded in the contaminated ground for removal of air mixed with the volatile contaminates after the ground water level has been lowered below the level of the contaminated ground. By this arrangement, both contaminated ground water and volatile contaminants are removed for disposal to greatly increase both efficiency and long-lasting effect. After remediation, the uncontaminated surrounding ground water flows back to further cleanse the now remediated ground.

13 Claims, 3 Drawing Sheets

CONTAMINATED GROUND SITE REMEDIATION SYSTEM

BACKGROUND OF THE INVENTION

SCOPE OF INVENTION

This invention relates generally to contaminated ground site remediating, and more particularly to the utilization of an array of dewatering wells which lower the water table level at the contaminated ground site prior to either vapor extraction or air purging of hydrocarbon contaminated air from the contaminated soil.

PRIOR ART

One means for remediating soil and ground water contaminated with volatile contaminants such as hydrocarbons is by the excavation of the contaminated soil and/or by the pumping and treating of contaminated ground water. Both processes are high in cost, however and can take many years to clean a site back to target levels.

Vapor extraction technology has been developed and applied to the treatment of contaminated soils containing volatile organic compounds (VOC). These systems remove or strip the volatile contaminants from the soil by a vacuum air flow removal process. The soil that is treated by this technique is above the water table in the Vadose zone. In other systems, the contaminated soil is excavated and temporarily conveyed to a volatilization chamber wherein contaminants are combusted or volatilized away and the remediated soil is returned back to the ground site or used as a road base substance. However, the amount of soil removed is only down to a depth of the water table.

Air sparging within the ground water table of a contaminated site is described in an article entitled "The Use of Aeration in Environmental Cleanups" by Richard A. Brown, PhD, et al. Although this sparging technology has provided a mechanism for limited decontamination of saturated soil within the ground water table level, nonetheless the use of only air in sparging produces limited decontamination results.

A previous invention of applicant disclosed in U.S. patent application Ser. No. 08/085,569, filed Jun. 30, 1993, teaches the benefits of air spraying in combination with an oxygen-enriched gas carrying a live bacteria which is selected to consume a particular organic volatile contaminant found in the contaminated ground. In the preferred embodiment of this prior art invention, vapor extraction is also used; however, the water table level is left unaltered.

The present invention teaches the utilization of the deployment of dewatering or well points downwardly embedded in an array within the contaminated ground site and an array of vapor extraction wells embedded in the contaminated soil as well. The dewatering points significantly lower the water table level in the vicinity of, and to a level beneath, the contaminated ground. Thereafter, blowing air through or vacuum extraction of newly exposed soil removed contaminated air within the contaminated soil. Both extracted contaminated air and extracted contaminated water are monitored for contaminant levels and when both reach a suitable low level, the system is removed and the water table is allowed to return to its normal level.

BRIEF SUMMARY OF THE INVENTION

This invention is directed to a system and method of remediating a ground site contaminated with volatile chemical material such as volatile organic compounds (VOC). The system includes an array of elongated spaced dewatering wells embedded into the contaminated ground for lowering the ground water level in this area. The system also includes an array of spaced vacuum extraction wells or air injection wells also embedded in the contaminated ground for removal of air mixed with the volatile contaminants after the ground water level has been lowered below the level of the contaminated ground. By this arrangement, both contaminated ground water and volatile contaminants are removed for disposal. After remediation, the uncontaminated surrounding ground water flows back to further cleanse the now remediated ground.

It is therefore an object of this invention to provide a contaminated ground site remediation system which removes volatile contaminants from the soil by sequential removal from contaminated ground water and contaminated air within the soil.

It is yet another object of this invention to provide a contaminated ground site remediation system which remediates VOC-contaminated ground for an extended period of time.

It is yet another object of this invention to provide a system for remediation of VOC-contaminated ground which is easily deployable and functions for the intended purpose without the removal of soil from the contaminated site.

It is another object of this invention to remove contaminated ground water to a depth below the vertical depth and to then make available and expose more soils that can be remediated by either pulling or pushing air across and through the soils which will strip away all of the hydrocarbons and thus remediate the site faster.

It is another object of this invention to remove volatile contaminants from water-saturated soils.

In accordance with these and other objects which will become apparent hereinafter, the instant invention will now be described with reference to the accompanying drawings.

DETAILED DESCRIPTION OF THE INVENTION

Figure 1:
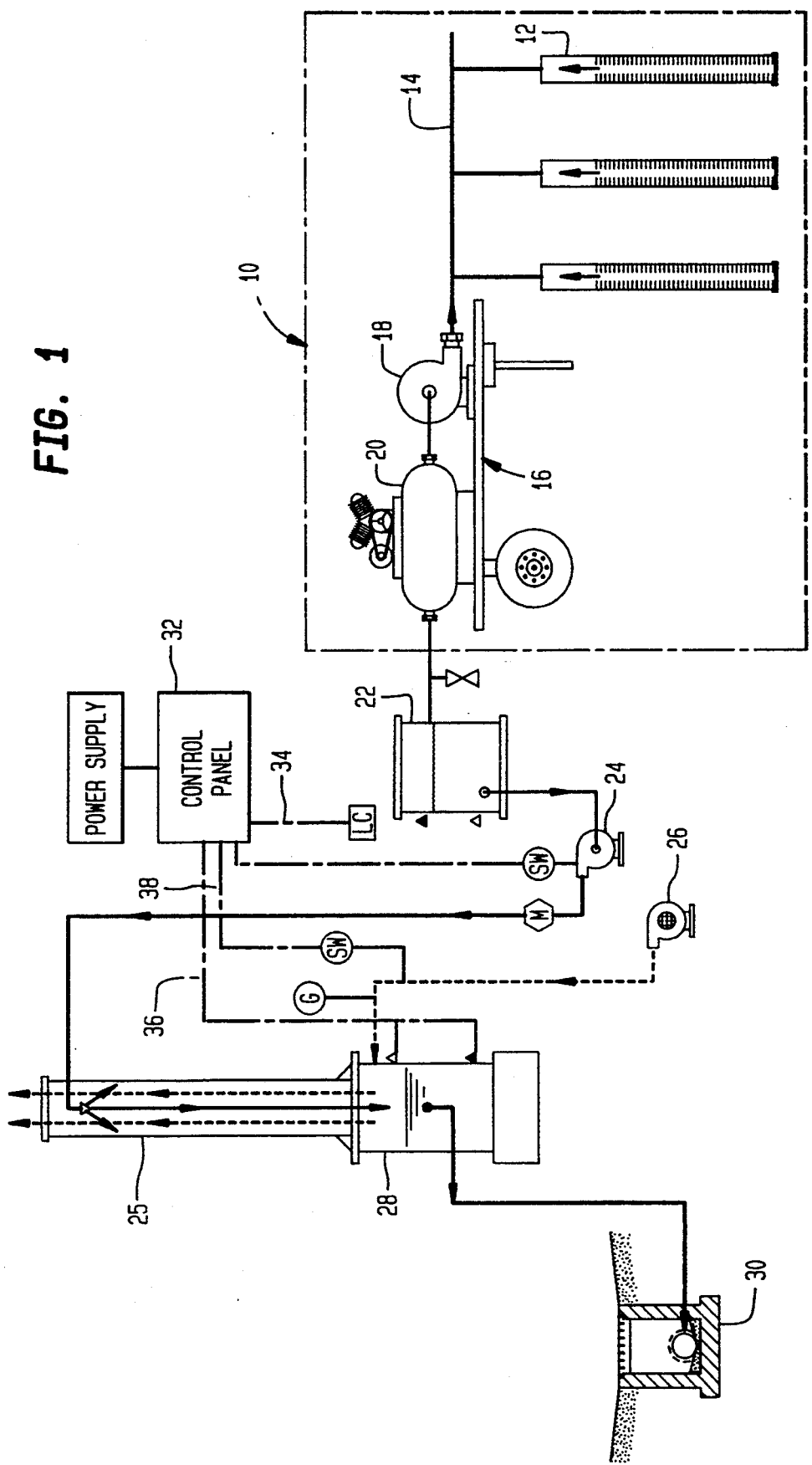
FIG. 1 is a schematic view of the dewatering system of the present invention.

Referring now to the drawings, the dewatering portion of the present invention is shown in FIG. 1 generally at numeral 10. This dewatering portion 10 includes a plurality of dewatering or well points 12 which are embedded into the soil in a conventional way described herebelow. Each of these dewatering points 12 is connected at an upper end above ground to a manifold 14 which, in turn, is operably connected to a water pump 18. A compressor 20 is utilized to transfer contaminated water. For convenience, the water pump 18 and the compressor 20 are mounted on a portable trailer 16 or skid mounted for easy system deployment.

Still referring to FIG. 1, the contaminated water removed by this arrangement 10 is transferred to an equalization holding tank 22 and then, by a transfer pump 24 into an air stripper tower 25 which forces fresh air by blower 26 upwardly through the air stripper 25 while the contaminated water falls downwardly in the direction of the arrows into tank 28. Thereafter, the remediated water is transferred into a retention basin 30. A control panel 32 includes control means for sending an appropriate control signal through electrical cables 34, 36 and 38 to regulate these functions.

This dewatering arrangement 10 is operated for a time sufficient to lower the ground water level within the contaminated ground site downwardly below the level of the contaminated soil and this process of dewatering is continued until the entire remediation has been completed.

Figure 2:
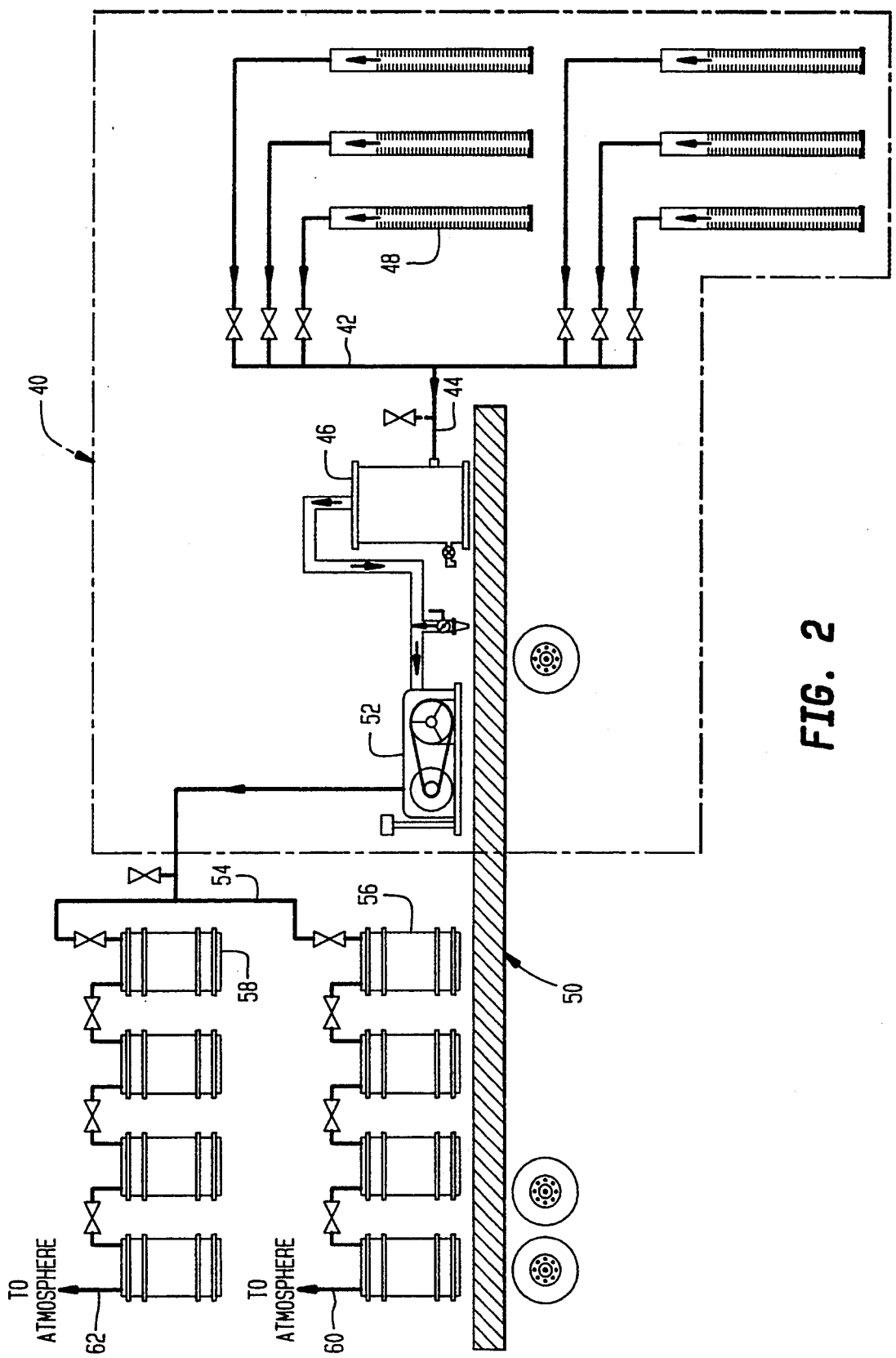
FIG. 2 is a schematic view of the vapor extraction system of the present invention.

In FIG. 2, the vapor extraction system is shown generally at numeral 40 and includes a plurality of vapor extraction wells 48 which are embedded into the contaminated ground site to a level above the lowered ground water level and above the lower level of the contaminated soil. Each of these vapor extraction wells 48 is connected at their upper end above ground to a manifold 42 which, in turn, is connected by tubular conduit 44 to an air/water separator 46, the outlet end of which is operably connected to a vacuum blower 52. Thus, air within the contaminated soil is vacuum suctioned out of the ground through this array of vapor extraction wells 48.

The contaminated air containing VOCs is forced from the vacuum blower 52 into an array of carbon containing filter units 56 and 58 through manifold 54. The remediated air is then discharged to atmosphere through outlets 60 and 62. This entire above ground arrangement of water separator 46, vacuum blower 52 and carbon unit filter arrays 56 and 58 is mounted for convenience on a movable trailer 50 which is easily deployable at a contaminated ground site area.

Figure 3:
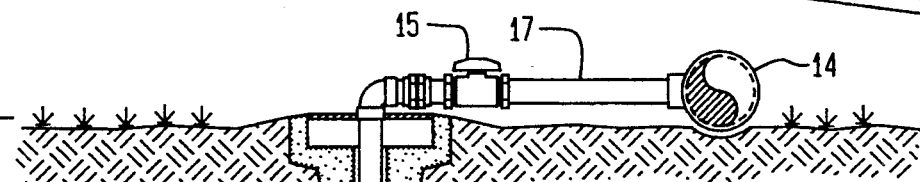
FIG. 3 is a side elevation section view of one dewatering or well point shown in FIG. 1.
Figure 3:
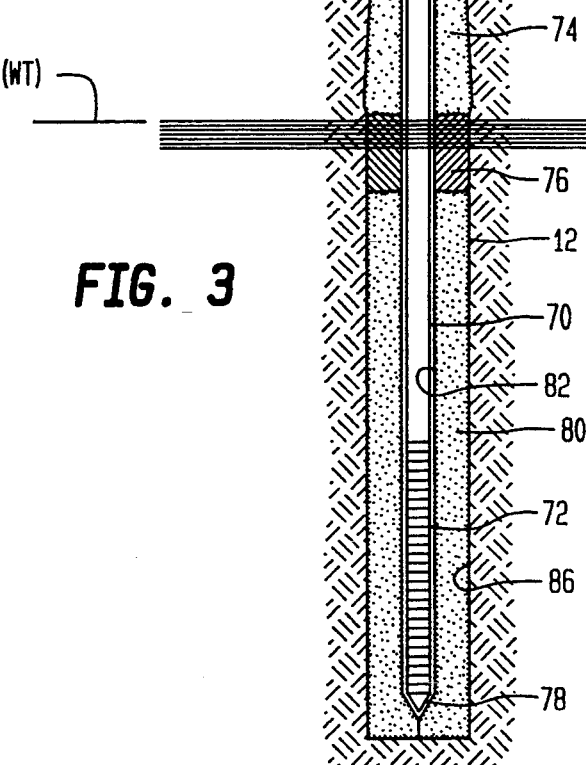
Figure 4:
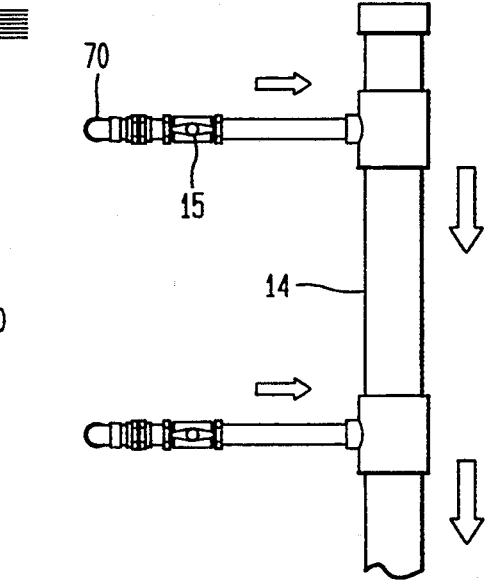
FIG. 4 is a top plan view of FIG. 3.

Referring now to FIGS. 3 and 4, a typical dewatering well 12 installation is there shown. This dewatering well 12 includes an elongated tubular conduit 70 having a foraminous lower end 72, the lower distal end 78 being pointed. Initially, a hole 86 is bored into the contaminated ground site area to a depth extending below the level of the contaminated soil. Thereafter, the dewatering conduit 70 is positioned within the hole which is then filled with packed sand 80. Just below the level of the water table WT, a seal 76 of the "Bentonite type" is then placed around the dewatering point 70 and atop the packed sand 80. A column of concrete grout 74 is then poured into the hole 86 above the seal 76 up to approximately the ground surface level. A valve 15 positioned in conduit 17 which extends between the upper end of the well point 70 and the manifold 14 is also provided.

Figure 5:
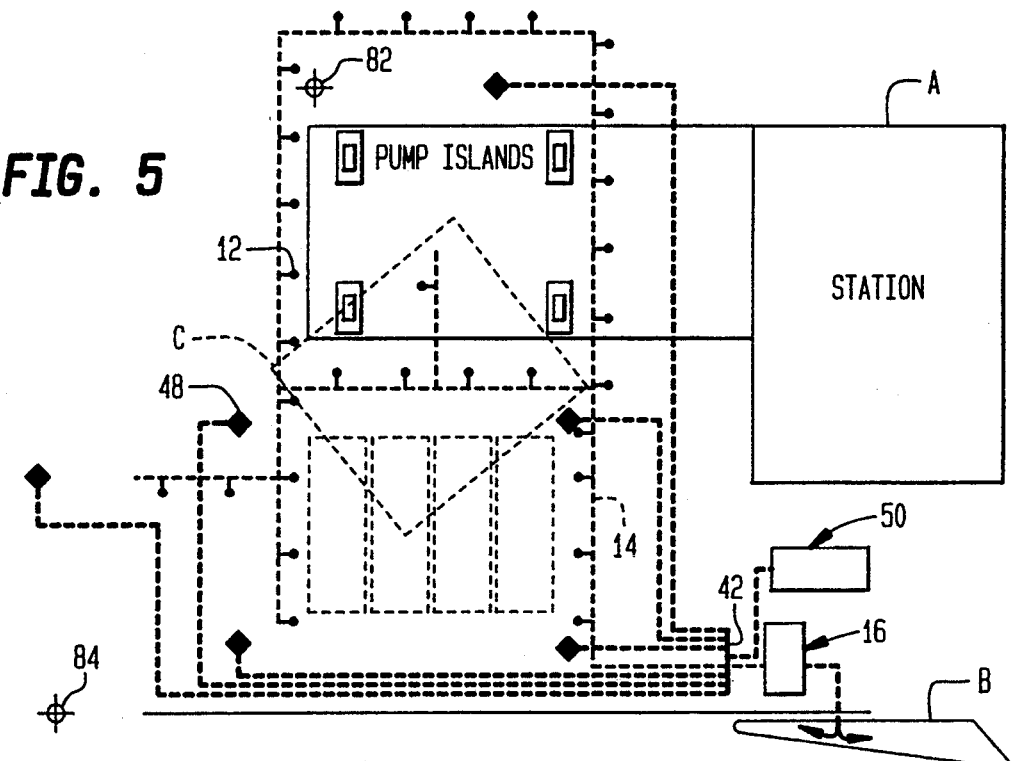
FIG. 5 is a schematic view of the preferred embodiment of the system as deployed in a contaminated ground site area.

Referring now to FIG. 5, a typical remediation system has been deployed in conjunction with an existing gasoline filling station A. The former tank location of the gasoline station A is shown at C.

An array of dewatering or well points 12 are first deployed into the contaminated ground site as previously described and interconnected by manifold 14 to portable trailer 16 as previously described. A plurality of vapor extraction wells 48 are also embedded into the soil and interconnected through manifold 42 to portable trailer 50 as previously described.

The system is operated by first lowering the ground water level by removal of contaminated ground water through the well points 12, remediated as by an air stripper or other process, i.e. carbon or diffuser, and deposited into a retention pond B. Thereafter, while the contaminated ground water level is maintained at a lower level below the level of the contaminated soil, the vapor extraction wells 48 are operated to strip or volatilize soil laden with volatile or organic contaminants for disposal as previously described.

Both a monitoring well 84 and a deep monitoring well 82 are also provided to measure the level of volatile contaminants in both the contaminated ground water and the air within the contaminated soil thereabove, as well as the water level of contaminated ground water. These monitored measurements of contamination, in conjunction with the monitoring of the contaminants contained in the air removed from the vapor extraction wells 48 and the contaminant level in the water being removed by the well points 12 determine when the system has accomplished its intended purpose. Thereafter, all well points 12 and vapor extraction wells 48 are removed, leaving the remediated site ready for reuse.

Referring again to FIG. 2, an alternate embodiment is provided wherein the air flow is reversed and fresh air is forced into the contaminated ground site through wells 48 which become air injection wells. Additionally, a live bacteria may be introduced into the fresh airstream as into conduit 44 to enhance and accelerate remediation.

Alternately, contaminated ground may be rapidly extracted by using a series of drilled recovery wells with independent pneumatic pumps or electric submersible pumps and be within the scope of this invention.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A contaminated ground site remediation system temporarily deployable to remove volatile contaminants comprising:

a plurality of elongated dewatering points embedded into the contaminated ground in a spaced array, each said dewatering point extending into and below the contaminated ground and below a water table level of the contaminated ground;

a water manifold operably connected to an upper end of each said dewatering point;

a dewatering pump means operably connected to said water manifold for removal of ground water being drawn into said water manifold by said pump means through said plurality of dewatering points to lower the level of the ground water downward below the contaminated ground;

a plurality of vapor extraction wells embedded into the contaminated ground in a spaced array, each said vapor extraction well extending into the contaminated ground above the water table level;

an air manifold operably connected to an upper end of each said vapor extraction well;

a vacuum pump means operably connected to said air manifold for suction removal of air containing volatile contaminants from the contaminated ground.

2. A contaminated ground site remediation system as set forth in claim 1, further comprising:
means for monitoring the level of contamination of gases and ground water within and beneath the contaminated ground.

3. A contaminated ground site remediation system as set forth in claim 1, further comprising:
an air stripper for vaporizing volatile contaminants from the contaminated ground water removed from the contaminated ground site before discharge into a water retention basin.

4. A contaminated ground site remediation system temporarily deployable to remove volatile contaminants comprising:
a plurality of elongated dewatering points embedded into the contaminated ground in a spaced array, each said dewatering point extending into and below the contaminated ground and below a water table level of the contaminated ground;
a water manifold operably connected to an upper end of each said dewatering point;
a dewatering pump means operably connected to said water manifold for removal of ground water through said plurality of dewatering points to lower the level of the ground water downward below the contaminated ground;
a plurality of air injection wells embedded into the contaminated ground in a spaced array, each said air injection well extending into the contaminated ground above the water table level;
an air manifold operably connected to an upper end of each said air injection well;
a pump means operably connected to said air manifold for introducing uncontaminated air into the contaminated ground through each said air injection well.

5. A contaminated ground site remediation system as set forth in claim 4, further comprising:
means for monitoring the level of contamination of gases and ground water within and beneath the contaminated ground.

6. A contaminated ground site remediation system as set forth in claim 4, further comprising:
an air stripper for vaporizing volatile contaminants from the contaminated ground water removed from the contaminated ground site before discharge into a water retention basin.

7. A contaminated ground site remediation system as set forth in claim 4, further comprising:
means for introducing a source of live bacteria into said uncontaminated air before said uncontaminated air is introduced into each said air injection well.

8. A method of remediating a contaminated ground site containing volatile contaminants comprising the steps of:
A. embedding a plurality of elongated dewatering points into the contaminated ground site in a spaced array, each said dewatering point extending into and below contaminated ground and below a water table level of contaminated ground;
B. connecting an upper end of each said dewatering point to a dewatering pump;
C. embedding a plurality of vapor extraction wells into the contaminated ground in a spaced array, each said vapor extraction well extending into contaminated ground above the water table level;
D. connecting an upper end of each said vapor extraction well to a vacuum pump;
E. operating said dewatering pump to remove ground water from the contaminated ground to lower the level of the ground water downward below the contaminated ground;
F. operating said vacuum pump for a time sufficient to remove volatile contaminated air from the contaminated ground.

9. A method of remediating a contaminated ground site containing volatile contaminants comprising the steps of:
A. embedding a plurality of elongated dewatering points into the contaminated ground site in a spaced array, each said dewatering point extending into and below the contaminated ground and below a water table level of contaminated ground;
B. connecting an upper end of each said dewatering point to a dewatering pump;
C. embedding a plurality of air injection wells into the contaminated ground in a spaced array, each said air injection well extending into the contaminated ground above the water table level;
D. connecting an upper end of each said air injection well to an air pump;
E. operating said dewatering pump to remove ground water from the contaminated ground to lower the level of the ground water downward below the contaminated ground;
F. operating said air pump for a time sufficient to remove volatile contaminated air from the contaminated ground.

10. A contaminated ground site remediation system temporarily deployable to remove volatile contaminants comprising:
a pumping means embedded into the contaminated ground extending into and below the contaminated ground and below a water table level of the contaminated ground for removal of ground water;
a plurality of air injection wells embedded into the contaminated ground in a spaced array, each said air injection well extending into the contaminated ground above the water table level;
an air manifold operably connected to an upper end of each said air injection well to lower the level of the ground water downward below the contaminated ground;
a pump means operably connected to said air manifold for introducing uncontaminated air into the contaminated ground through each said air injection well.

11. A contaminated ground site remediation system as set forth in claim 10, further comprising:
means for monitoring the level of contamination of gases and ground water within and beneath the contaminated ground.

12. A contaminated ground site remediation system as set forth in claim 11, further comprising:
an air stripper for vaporizing volatile contaminants from the contaminated ground water removed from the contaminated ground site before discharge into a water retention basin.

13. A contaminated ground site remediation system as set forth in claim 10, further comprising:
means for introducing a source of live bacteria into said uncontaminated air before said uncontaminated air is introduced into each said air injection well.

* * * * *